June 12, 1934.  C. MATHER, JR  1,962,932
APPARATUS FOR PREVENTING UNDUE CHILLING OR FREEZING OF LIQUIDS
USED IN MOTOR VEHICLE AND LIKE ENGINES
Original Filed Dec. 26, 1931
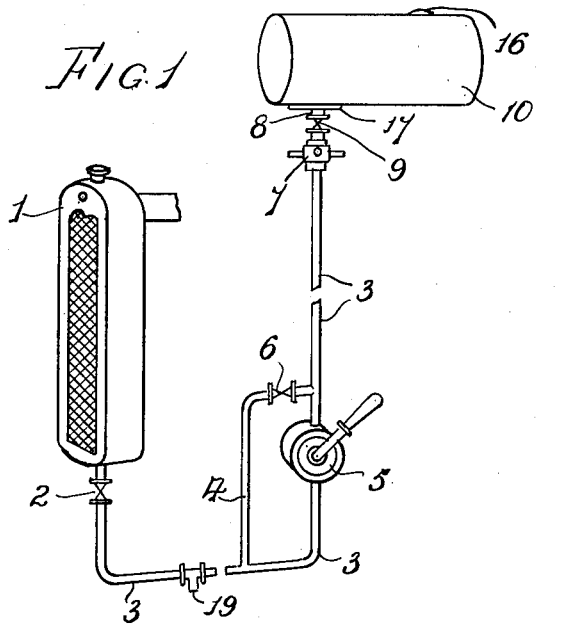
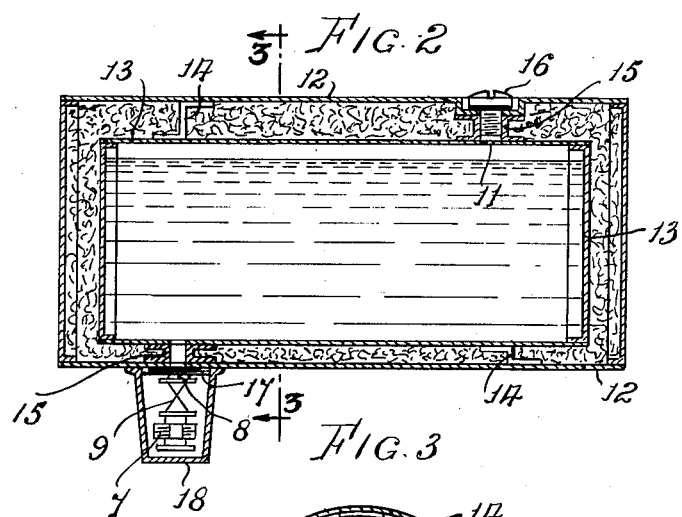
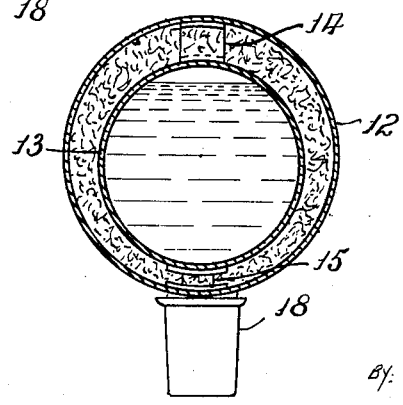
INVENTOR
COLIN MATHER, JUNIOR
BY Rueger & Boyne
ATTORNEYS Patented June 12, 1934

1,962,932

UNITED STATES PATENT OFFICE 1,962,932

APPARATUS FOR PREVENTING UNDUE CHILLING OR FREEZING OF LIQUIDS USED IN MOTOR VEHICLE AND LIKE ENGINES

Colin Mather, Jr., Old Trafford, England

Application December 26, 1931, Serial No. 583,326. Renewed March 9, 1934. In Great Britain September 17, 1931

3 Claims. (Cl. 123—174)

This invention has reference to apparatus for preventing undue chilling or freezing of liquids used in motor vehicle and like engines and has for its object to provide means whereby liquids such as cooling water of the radiators of internal combustion engines or oil used in lubricating such engines or water used in boilers such as steam water boilers and crane boilers which are often in exposed positions, may be stored while hot on the machine or vehicle when not required further for a short time in their normal activities and retained in a hot condition so that when needed they can be returned to the engine or machine thus preserving the heat already given to them and not only preventing freezing with consequent damage to the engine but actually assisting the starting action by being returned hot to the engine or other machine.

According to this invention in motor vehicle and like engines wherein liquid is used during the operation of the engine or machine, the container for the liquid, or the circuit through which it is passed is connected to a heat insulated storage vessel into which the hot liquid is passed when not further wanted in the engine at that time, the heat insulated storage vessel thus retaining hot liquid passed into it and keeping it hot so that when required it can rapidly be returned to its normal container or circuit.

The invention is more particularly set forth with reference to the accompanying drawing in which Fig. 1 is a general diagrammatic view illustrating the application of the invention to the radiator of a motor vehicle Fig. 2 is a longitudinal section of a liquid container as used in this invention and Fig. 3 is a cross section on the line 3—3 of Fig. 2.

In the arrangement shown in Fig. 1 which shows the invention applied by way of illustration to the storage of the cylinder jacket or radiator water used in internal combustion engines, the radiator 1 is provided with a stop cock 2 at a suitable low position to which is connected a pipe 3. This pipe 3 has a branch 4 which leaves it before the pump 5 and joins it again above the pump 5, a stop cock 6 being provided in the branch. At the top end the pipe 3 is provided with a coupling member 7 which connects it to a pipe 8 having a stop cock 9 which pipe 8 communicates with an insulated container 10 provided with a suitable air release hole or valve 11.

In Figs. 2 and 3 secondary views of the container are shown. In these figures an outside container 12 is used within which is an inside container 13. The inside container is not directly in contact with the outside container 12 but is separated therefrom as by brackets 14 and fittings 15 which brackets and fittings provide as little surface contact between the two containers as possible.

The space between the two containers is packed with heat insulating material in the constructions shown in the drawing and for the majority of purposes this is probably the best way of insulating the inside container 13. It may however, be desirable in some instances to provide insulation by means of a vacuum thus making the whole container 10 in the form of a "Dewar flask". This arrangement does not affect the substance or body of the invention but is merely a provision which can be made according to circumstances and requirements. The fittings 15 which of necessity must be provided to afford access to the inside container 13 are conveniently adapted to act also as supports between the two containers and in the top fitting 15 the screw plug 16 is provided having an air hole 11. If it be desired however, the plug may not have the air hole but may merely be removable so that when liquid is put into the inside container 13 the air can escape from the hole in the fitting 15 and the hole can later be closed by a screw plug 16 which may if desired be again covered by an insulating cap.

The bottom fitting 15 by which the liquid passes in and out is placed as far as possible from the top fitting 15 through which the air passes. The bottom fitting 15 is also provided with the short pipe 8 to which a coupling member 7 is attached and conveniently outside the container at this point a slight extension 17 is made on to which an insulating cap 18 can be screwed, if and when the pipe 3 is itself disconnected by the coupling 7.

When it is desired to use the apparatus to store the hot water from the radiator 1 the pipe 3 by the coupling 7 is connected to the short pipe 8 and the stop cock 9 is opened, the stop cock 6 is closed and the stop cock 2 is opened and the air release member 11 is made operative. The pump 5 is then operated and the hot water is pumped up into the inside insulated container 13 until either the container is full or all the water has been pumped out of the radiator 1. When this is done the stop cock 9 is closed, the air releases is also closed and it is convenient and desirable to disconnect the pipe coupling 7 and to put the insulating cap 18 over the exposed end of the short pipe 8. A let off cock 19 is provided for draining the pipe. In this condition the water will remain hot for a considerable time in the inside container and when it is again desired to return it to the radiator the necessary communications are made and the air release is opened and by opening the stop cocks 9, 6 and 2 the water is returned by gravity to the radiator 1 after which the stop cock 2 is closed maintaining the water in the radiator.

It is possible that in pumping the water into the container 13 that the container will not be completely filled thus leaving an air pocket above the water and as such an air pocket assists radiation of heat it is advisable to counteract this tendency by mounting the inside container eccentrically in the outside container as clearly shown in Figs. 2 and 3, but it is not necessary that this arrangement should be used and if desired the two containers may be mounted concentrically.

While the invention has been described and shown in Fig. 1 as having the container 10 above the level of the radiator so that the water is pumped into the container it will be appreciated that it may instead be placed below the radiator so that the processes of filling and emptying are reversed in that the hot water flows into the container by gravity and is pumped from the container back into the radiator. This arrangement however does not affect the essential features of the invention but is merely one of arrangement.

While the invention has been exemplified with reference to the radiator water of an internal combustion engine it is also practicable in exactly the same way to the circulating oil used in the engine and by returning the hot oil to the engine at the same time as hot water is returned to the radiator system the trouble at present experienced in starting an internal combustion engine when cold is very largely eliminated if not entirely overcome.

In the same way the boiler water from steam lorries, cranes and the like can be drained at night and preserved in a hot condition so that the boiler remains dry when not required and is supplied with hot water when it is again desired to start up the engine. It will be understood that the heat insulated container itself must be provided with an inlet and outlet to facilitate the passing of air either out or into the container during the filling and emptying.

In conjunction with the apparatus as described suitable locking or warning devices are preferably used to indicate whether the liquid is in the system or in the heat insulated chamber and by this arrangement any danger of starting the engine without the water and/or oil in its necessary place is overcome.

What I claim as my invention and desire to secure by Letters Patent is—

1. In a motor vehicle having an engine and a liquid containing circuit wherein a liquid is housed during the running of the engine, a heat insulated liquid container carried on the vehicle wherein said liquid is housed when the engine is not running, said container having an outside casing, and an inside casing, supports in said outside casing for maintaining said inside casing in position and out of contact with said outside casing, a heat insulating medium between said inside casing and said outside casing, a closable opening from said inside casing to the exterior of said outside casing for allowing liquid to pass to and from said inside casing, a closable opening from said inside casing to the exterior of said outside casing to allow air to pass to and from said inside casing, a pipe connection to said closable opening whereby said liquid passes to and from said inside casing, said pipe connection being at one end of a pipe connection line, stop cocks in said pipe connection line between said container and said liquid containing circuit and a liquid pump in said pipe connection line through which said liquid is pumped from said circuit to said container along said pipe connection line.

2. In a motor vehicle having an engine and a liquid containing circuit wherein said liquid is housed when said engine is running, a heat insulated liquid container carried on said vehicle for housing said liquid when said engine is not running said container comprising an outside casing and an inside casing, supports inside said outside casing for maintaining said inside casing in position, and out of contact with said outside casing, a heat insulating medium between said inside and said outside casings, a closable opening from said inside casing to the exterior of said outside casing, a connecting member on the exterior of said outside casing forming part of said closable opening, a pipe connection line connected at one end to said liquid containing circuit, a coupling member at the other end of said pipe connection line adapted to be coupled to, and uncoupled from said connecting member on the exterior of said outside casing, a cock on said connecting member, a closable opening at the highest point of said inside casing for allowing air to pass, a heat insulating covering member to cover said closable opening, a heat insulating covering member to cover said connecting member and said cock on the exterior of said outside casing for insulating and enclosing said connecting member and said cock when said pipe coupling is detached from said connecting member a cock in said pipe connection line adjacent to said liquid containing system and a liquid pump in said pipe connection line through which said liquid is pumped from said circuit to said container.

3. In a motor vehicle having an engine and a liquid containing circuit wherein said liquid is housed when the engine is in use, a heat insulated container carried on the vehicle, wherein said liquid is housed when said engine is not running said container comprising an outside casing and an inside casing, supports inside said outside casing for maintaining said inside casing in position, and out of contact with said outside casing, said supports being arranged and designed to hold said inside casing in said outside casing in such a position that there is a greater distance between said casings at the top than at the bottom, whereby a greater depth of insulation is provided above the top of said inside casing thereby compensating the cooling tendency of any air remaining in said inside casing after said liquid has been passed thereinto.

COLIN MATHER, Junior.